March 24, 1959 R. SMITH-JOHANNSEN 2,879,413

PHONOGRAPH PICKUPS

Filed Aug. 21, 1956 3 Sheets-Sheet 1

March 24, 1959 R. SMITH-JOHANNSEN 2,879,413

PHONOGRAPH PICKUPS

Filed Aug. 21, 1956 3 Sheets-Sheet 2

March 24, 1959 R. SMITH-JOHANNSEN 2,879,413

PHONOGRAPH PICKUPS

Filed Aug. 21, 1956 3 Sheets-Sheet 3

United States Patent Office 2,879,413

Patented Mar. 24, 1959

2,879,413

PHONOGRAPH PICKUPS

Robert Smith-Johannsen, Niskayuna, N.Y., assignor to Sonotone Corporation, Elmsford, N.Y., a corporation of New York Application August 21, 1956, Serial No. 605,308

5 Claims. (Cl. 310—8.2)

This invention relates to phonograph pickups, and more particularly to phonograph pickups which are utilized for transducing undulations of record traces, usually in the form of an undulating record groove, into corresponding electric signal waves.

Although the present invention was evolved in connection with phonograph pickups intended for use with laterally cut record groove traces generally used in making conventional phonograph records, and specific exemplifications of such pickups will be herein described, the principles of the invention are also applicable for pickups designed for use with vertically-cut record grooves.

Most generally used phonograph pickups have a mechano-electric transducer which is driven by a stylus engaging the moving record groove of the record disc or the like for translating the undulations of the record trace into corresponding electric signals. The stylus is usually carried on the forward end of a transducer drive-rod which transmits the undulations of the stylus to the transducer.

If phonograph pickups of the foregoing type are to be used for high-fidelity reproduction of records, it is of utmost importance to secure a constant or smooth frequency response for driving forces applied to the stylus by or representing the undulations of a high fidelity record of the audible frequency spectrum. In practice, fluctuations of the frequency response are difficult to eliminate without interfering with other design requirements of a phonograph pickup. As a result, prior-art pickups had to be provided with cumbersome and complicated structures in order to achieve with them the desired smooth frequency response over the required frequency spectrum.

Among the objects of the invention is a structurally simple phonograph pickup which is substantially identical in structure with prior-art pickups that operated with a fluctuating frequency response, but which is combined with simple means for elimination of the response fluctuations and assuring a constant or smooth frequency response of the pickup.

The foregoing and other objects of the invention will be best understood from the following description of exemplifications thereof, reference being had to the accompanying drawings, wherein:

Fig. 1 is a side elevation of the complete pickup of the invention, with a side wall thereof removed to expose the interior elements of the pickup assembly;

Fig. 1–A is a side view of the side wall removed from the casing shown in Fig. 1 as seen from the interior of the casing;

Fig. 2 is a cross-sectional view along lines 2—2 of Fig. 1;

Fig. 2–A is a cross-sectional view along lines 2–A, 2–A of Fig. 1;

Fig. 3 is a side view similar to Fig. 1 of the piezo-electric transducer unit only;

Fig. 3–A is a cross-sectional view along lines 3–A, 3–A of Fig. 3;

Although the principles of the invention are applicable to phonograph pickups having one transducer driving stylus, for instance for reproducing sound records of only one type of record such as the high-fidelity records known as LP records on discs rotating at 33 r.p.m., the principles of the invention will first be explained in connection with a phonograph pickup having two selectively settable styli for reproducing signals from relatively deep record grooves rotating at 78 r.pm. or from relatively shallow record grooves rotating at 33 r.p.m. Furthermore, although the phonograph pickups of the invention may be operated with any of the known types of mechano-electric transducer structures including those utilizing magnetic structures, electrical resistance elements and piezoelectric structures for converting mechanical strain or motion into electric signals, and with any type of connection between the groove-engaging stylus and the transducer structure—the present invention will be described in connection with a pickup structurally similar to that described in Klingener Patent No. 2,717,929 and operating with a permanently polarized ceramic titanate transducer.

Figures 1, 1A, 2, 2A, 3, 3A:
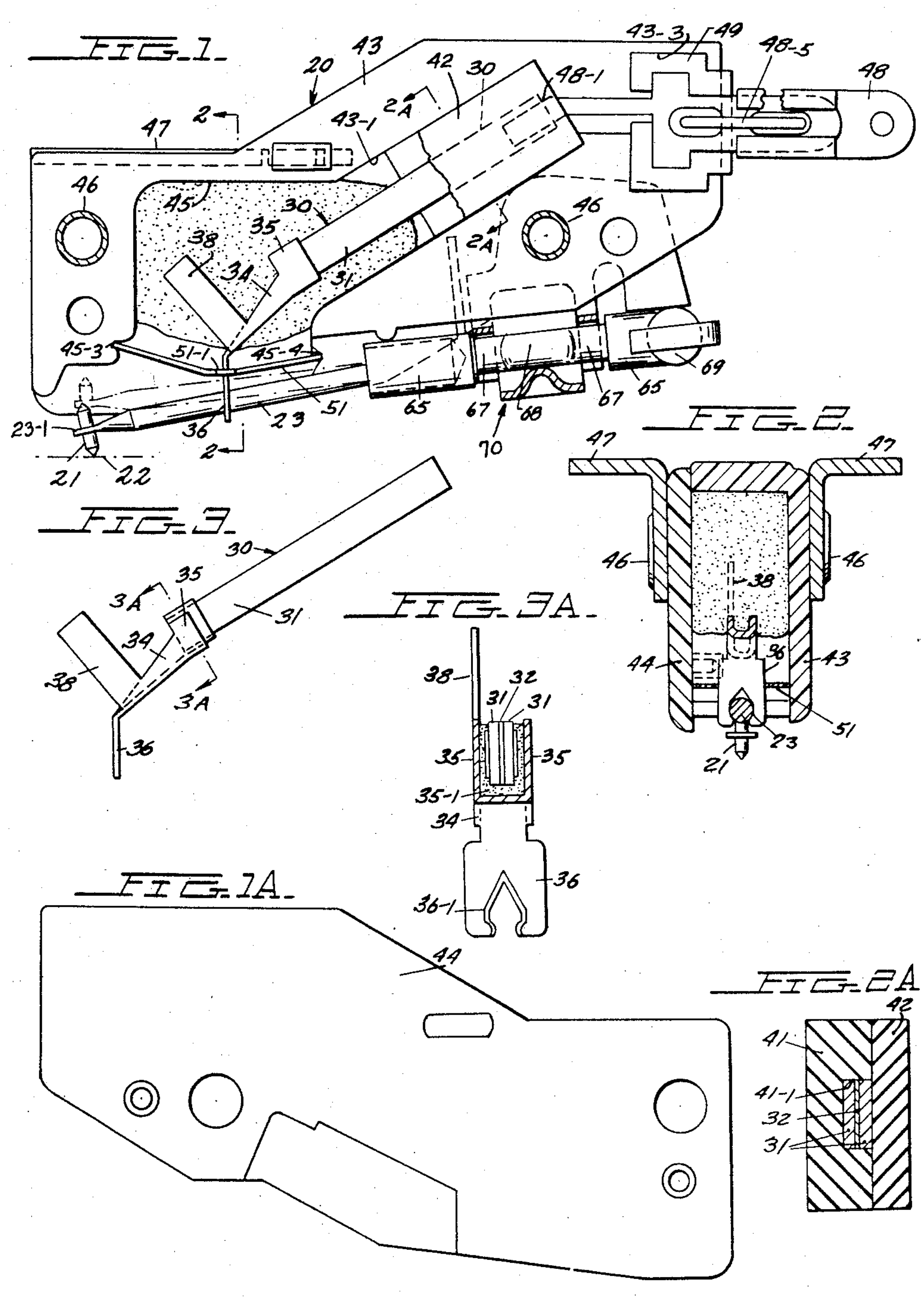

Figs. 1–6 show one form of a pickup 20 exemplifying the invention. Fig. 1 shows the pickup 20 in its operative position held on the downwardly facing side of the front end of a tone arm (not shown), with one of its two styli 21 engaging a record groove trace indicated by dash-double-dot line 22, and representing the spiral record groove of a record disc moving in a forward record-playing direction (or from right to left in Fig. 1) which is also substantially tangential to the circular record groove trace 22. The stylus 21 is held in the forward end of a stylus drive rod 23 which extends substantially in a vertical plane through the forward playing direction of the record groove trace 22 in generally the same direction. The phonograph pickup of Fig. 1 is designed for operation with a laterally cut record groove 22 which imparts to the stylus a lateral undulatory motion, but as explained above, the pickup of the invention may be designed for operation with a vertically cut record groove.

The pickup (Figs. 1–6) comprises a mechano-electric transducer generally designated 30 (Fig. 3) shown formed of two strip-like ceramic titanate elements 31 having fused exterior metal electrodes, and which are united to the opposite sides of a strong, flexible resilient metal strip 32 along their facing surfaces so as to maintain at least the adjacent stratum of the two ceramic titanate strips under compressive strain and prevent fracture thereof when they are subjected to the undulatory bending motions in a direction perpendicular to their extended strip surfaces.

By way of example, each transducer element 31 of a particular pickup, may be formed of a dielectric ceramic layer consisting essentially of barium titanate having a thickness of about 0.10 inch, a width of about ⁵⁄₆₄ of an inch, and a length of about ¾ of an inch. The metallic backing strip may have a thickness of about 0.005 inch, and the same longitudinal and lateral dimensions as the piezoelectric elements 31 that are secured thereto by a solidified solder stratum which maintains at least the adjacent strata of the ceramic element 31 under compressive strain.

The forward end of the lever-like, strip-shaped transducer 30 is drivingly coupled to the stylus drive rod 23, the forward end of which carries two oppositely projecting styli 21. The forward portion of the transducer 30 has secured thereto an elongated drive extension 34 extending downwardly and forwardly therefrom for coupling engagement with the styli drive rod 23. The drive extension 34 is shown formed of a metal strip bent into a channel shape of the required stiffness and having at its rear, U-shaped bent arms 35 which are insulatingly affixed as by suitable insulating cement 35–1, with or without an interposed insulating strip, to the forward drive portion of the transducer strip 30 so as to form an integral fixed drive extension thereof. At its downward front end, the drive extension 34 has a flat coupling portion 36 with a coupling recess 36–1 shaped for receiving therein and detachably holding in coupling driving engagement the forward region of the elongated stylus drive rod 23. The stylus drive rod 23 may be formed of a solid or tubular strip of metal having a flattened front end 23–1 in which the two oppositely directed styli 21 are secured.

The rear part of the piezoelectric transducer 30 is held restrained against motion by holding it embedded in an elastomer body 41, 42 (Fig. 2–A) of plasticized elastomer substance arranged to exert on the embedded transducer portion reaction forces resisting deformation of the transducer 30 so that bending forces imparted to its forward end generate therein corresponding electric signals impressed on its external surface electrodes. The elastomer body 41, 42 may be formed of a material such as a vinyl chloride compound or the like which embodies sufficient plasticizer substance so that when the forward end of transducer 30 is subjected to lateral undulatory bending forces in a direction perpendicular to its flat major surface (shown extending in the plane of Fig. 1), the elastomer body 41, 42 will restrain the motion and deformation of the transducer 30 and cause it to generate corresponding electric output signals by proper distribution of the applied mechanical strains throughout its ceramic piezoelectric layers 31. In the form shown, the elastomer pad or body 41 constitutes a block-like structure of rectangular cross-section provided with a recess 41–1 in which the rear part of the piezoelectric transducer 30 fits, the transducer 30 being held clamped in the recess 41–1 of the elastomer body 41 by the complementary elastomer body 42 which has a rectangular cross-section complementing the cross-section of the elastomer body 41.

The complementary elastomer bodies 41, 42 are held clamped in their proper operative positions in which they hold clamped therein the rear part of the strip-like elongated piezoelectric transducer 30 by walls of a casing structure shown consisting of a hollow casing 43 with a complementary cover wall 44 (Fig. 1–A). The casing 43 and its complementary cover wall 44 are rigid, and in the form shown, they are made of cast metal. The inwardly facing side of casing 43 has formed therein an elongated, rectangular compartment 43–1 shaped to hold clamped therein the elongated transducer-restraining elastomer body 41, 42 and a forward compartment 45 into which the driven forward end of transducer 30 extends. The cover wall 44 is held clamped to the casing 43 in their assembled position in which they enclose the compartment spaces 43–1 and 45 by suitable clamping means such as two hollow rivets 46 extending through suitable fastening holes formed in the front end and the rear portions of the casing walls 43, 44. Two metallic mounting brackets 47 may be affixed to the exterior of the casing walls 43, 44 by the forward rivet 46 (Fig. 2).

Two strip-like external terminal members 48 of sheet metal have their inward end portions 48–1 held clamped in contact with the exterior surface electrodes of the two titanate ceramic layers 31 of transducer 30 by the overlying elastomer bodies 41, 42 within which the transducer rear part is held clamped. The strip-like terminal members 48 are held assembled in a cavity of an insulating terminal mounting member 49 (Figs. 9–12) formed, for instance, of insulating molded material, the two metallic terminal strips being held insulated from each other by a spacing member of molded insulating material held affixed as by cement within the recess or cavity of the terminal mounting member 49. The terminal mounting member 49 of insulating material is held clamped in assembled position within a casing recess 43–3 of casing 43 by the two metallic casing walls 43, 44. To provide a grounding connection for one of the exterior surface electrodes of the transducer 30, one of the strip-like terminal members 48 is provided with a cut-out inward grounding tongue projection 48–5 overlying the insulating terminal mounting member 49. The outer metallic contact wall 44 of the casing makes contact with the grounding part or tongue 48–1 of the external terminal member 48, thereby establishing a grounding connection for one of the external surface terminals of the piezoelectric transducer 30.

Proper mounting of the terminal mounting member 49 and its assembled terminal 48 in contact engagement with the external surfaces of the transducer assembly 30, may be effected as follows: After first assembling the recessed elastomer pad 35 in the rear compartment 43–1 of the casing body 40, the terminal assembly 49 with its two insulated terminal member strips 48, is placed in the terminal assembly recess 43–3 of the casing 43 so that the two inward terminal contact strip ends 48–1 occupy positions in which they are clamped into electric contact with the surface electrodes of the transducer 30 when it is assembled between the two elastomer pads 41, 42.

Thereupon the rear part of the transducer assembly 30 is slipped into its position within the rectangular recess 41–1 of the elastomer pad so that the external surface electrodes of the two piezoelectric ceramic layers 31 of the rear part of the transducer 30 make contact with the inner terminal ends of the two terminal strips 48. Thereupon the outer elastomer pad 44 is assembled within the remaining space of the rear compartment 43–1 so as to overlie the assembled complementary inner elastomer pad 41 with the transducer 30 assembled therein together with the inner contact ends 48–1 of the two terminal members 48 for clamping them together in respective contact engagement when the complementary casing wall 44 is assembled over and secured to casing 43.

Except for the stiffer drive extension 34 and the replacement of the forward elastomer body restraint with the rearward elastomer body 41, 42, the phonograph pickup assembly described above is similar to that of Klingener Patent No. 2,717,929, and its frequency response has fluctuations which are difficult to eliminate.

In accordance with the invention, an elongated generally flat transducer member—with a forward part driven by a stylus in a direction transverse to its flat sides and a rearward part restrained by elastomer material—is enabled to operate with a frequency response which is substantially free of fluctuations by immersing at least an intermediate part of the driving connection between the stylus and transducer member in a viscous fluid medium which resists the vibratory motion of the so immersed part of the stylus drive connection.

In electro-mechanical signal transducers of the type represented by the phonograph pickup shown, the motion-transmitting portion or connection of the vibratory transducer structure has to pass through a casing or compartment opening into the exterior space from or to which the vibratory motion of the transducer structure is transmitted. In cases where the motion-transmitting connection of the transducer vibrates with a rotary oscillatory motion around its axis, the casing opening through which it passes into the exterior space may be readily sealed off so as to prevent leakage of the damping liquid from the casing compartment to the exterior space. However, in the case of electro-mechanical transducers, such as the pickup of Figs. 1–6, where the motion-transmitting connection of the transducer vibrates transversely to a major dimension thereof, such as transversely to its elongated direction, the casing opening must be sufficiently wide to permit free movement of the motion-transmitting connection passing therethrough.

Free-flowing silicone fluids are particularly desirable as damping media for electro-mechanical signal transducers designed for operation in the audio frequency range up to about 20,000 cycles per second. Of the various free-flowing silicone fluids, high-purity dimethyl silicone oil having a viscosity in the range of about 5,000 to 10,000 centipoises, is of a higher order of effectiveness as a damping fluid, than others. In practice, extremely good results are obtained with pure dimethyl silicone oil consisting of a straight chain of dimethyl siloxy groups and having at each of the ends of the chain a trimethyl siloxy group. Such dimethyl silicone fluid may have admixed thereto small amounts of ethyl or phenyl silicone oil, but for best results such admixture should be less than about 2%.

In the case of electro-mechanical transducers having a motion-transmitting vibratory portion passing through an opening of the transducer casing compartment to the exterior, it was heretofore practically impossible to place silicone damping fluid in the compartment space of the casing adjoining such casing opening, because no way was found for preventing creepage and/or leakage of the silicone damping fluid through the gap spaces of the casing opening, which had to be kept large enough to prevent contact between its edges and the vibratory transducer part passing therethrough.

An object of the invention is the combination of an electro-mechanical transducer, having a vibratory part which vibrates transversely to a major dimension thereof and passes through an opening of the transducer casing to the exterior space, with a silicone fluid placed in the interior of the casing adjoining the opening, which fluid remains sufficiently free-flowing for securing the desired high damping action with minimum loss of energy, and with the silicone fluid having nevertheless a sufficiently high yield value against flow to prevent leakage or creepage of the fluid through the casing opening to the exterior space.

One phase of the invention is based on the discovery that free-flowing silicone fluid of low viscosity and which is extremely effective as a mechanical dumping medium for electro-acoustic transducers, may have added thereto a small amount of inert powder particles, which is just sufficient to change its consistency from that of a free-flowing fluid to a fluid which has a yield value high enough to prevent any creepage or leakage of the silicone fluid through the transducer casing opening through which a transducer part passes, without materially impairing the high effectiveness of the silicone fluid as a desirable damping medium for the transducer.

The invention is based on the discovery that the silicone fluid placed in the casing compartment of an electro-acoustic transducer for securing highly effective damping thereof, will retain its high effectiveness as a damping medium, even if it is combined with an inert powder content which changes the consistency of the free-flowing silicone fluid so as to give it a yield value high enough to prevent any creeping, bleeding or escape of the fluid from the casing opening to the exterior thereof. In particular, the invention is based on the discovery that with a filler content of at most about 7 parts to 100 parts of silicone oil, dispersed in the silicone fluid in such a way as to retain it uniformly dispersed therein, the high effectiveness of the silicone fluid as a damping medium for the electro-mechanical transducer is retained, while preventing and suppressing creepage, leakage or escape of the silicone fluid through the casing opening through which the vibratory part of the transducer passes to the exterior space, so as to vibrate within the opening without coming in contact with its edges. Suitable inert powders for giving the free-flowing silicone oil the desired yield value to prevent escape thereof through the transducer casing opening while retaining its effectiveness as a damping medium, are powders having a millimicron particle size range such as a size range of the order of 1 to 30 millimicrons.

A phase of the invention is the discovery that silica powder particles are particularly effective for dispersing in small amounts in silicone fluid for retaining to the maximum its desirable damping properties, while giving the fluid a sufficiently high yield value to prevent its escape or leakage through the small casing opening through which the vibratory part of the transducer passes to the exterior space. In practice, extremely good results are obtained with high-purity silica powder having a millimicron particle size range, and commonly known as pure "silica soot." In practice, such pure, fine silica powder particles may be obtained by subjecting a gas phase of silicon tetrachloride to combustion. However, instead of pure silica powder, other pure inert powders such as pure alumina or pure zirconia powders of the same particle size, may be used, although silicone fluids having such other particle fillers are of a lower order of effectiveness as damping media than those having a pure silica powder filler.

In order to render a silicone fluid with the minimum filler content of an inert powder suspended therein, practically fully effective as a damping medium, it is important to combine with the filler powder particles an additional coating fluid which has a tendency to form an enveloping surface layer over the filler powder particles, and which has a minimum or negligible solubility in the silicone fluid. Good results are obtained by using as a surface coating medium for the inert powder particles dispersed in the silicone oil, a small amount of a grade of a polyalkalene glycol, such as diethylene glycol, triethylene glycol, propylene glycol, and dipropylene glycol, and derivatives of such polyalkalene glycols, which has the property of not going into solution or otherwise combining with the silicone oil, except to a negligible degree, such as at most a few percent. Good results are obtained by using an amount of the coating fluid in a proporation equal to about 20% to 70% of the amount of the inert powder particles, depending on the quantity of the powder particles added to the silicone fluid.

Good results are obtained by combining the silicone fluid with the powder particles and the coating fluid in such amounts that the resulting damping fluid has a plastic viscosity of .80 to 1.20, and a yield value of 20 to 30. For the purpose of this specification, "yield value" is the value at which the tangent of the Brookfield viscosity curve at 20 r.p.m. of spindle No. 7 of the RDF Brookfield viscosity meter, intercepts the Brookfield unit coordinate; and the term "plastic viscosity" is the slope of the tangent of the Brookfield viscosity curve at 20 r.p.m. of such spindle. Since the available literature supplied by the Brookfield Engineering Laboratories, at Stoughton, Massachusetts, contains a full explanation of the manner of plotting such Brookfield viscosity curves with such Brookfield viscosity meters, no further description thereof is needed herein.

Below are given by way of example of specific compositions of a silicone fluid which gives good results as a highly effective damping medium, and nevertheless remains confined in the casing compartment of the transducer under suppression of creepage thereof by way of the casing opening through which the transducer-motion-transmitting connection passes to the exterior space.

*Example 1*

| | Parts |
|---|---|
| Dimethyl silicone fluid (sold by General Electric Company under the trade-name "Viscasil 5000") | 100 |
| Silica powder soot (pure silica, sold by Cabot Company under the trade-name "Cabosil") | 5 |
| Polyalkylene glycol (sold by Union Carbide and Carbon Company under the trade-name "Ucon LB 1145") | 2 |

*Example 2*

| | Parts |
|---|---|
| Dimethyl silicone fluid (sold by General Electric Company under the trade-name "Viscasil 5000") | 100 |
| Silica powder soot (pure silica, sold by Cabot Company under the trade-name "Cabosil") | 5 |
| Polyalkalene glycol (sold by Union Carbide and Carbon Company under the trade-name "Ucon LB 1145") | 1 |

The silica powder and coating liquid are stirred into the silicone fluid, and after incorporation therein, the fluid mixture is run through a three-roll paint mill at close spacing 7 to 8 times, or until there is no visible sign of non-uniformity of dispersion. Good results are obtained with similar compositions containing 2 to 7 parts of silica powder to 100 parts of silicone fluid, together with the coating fluid in amounts $\frac{1}{10}$ to $\frac{7}{10}$ times the amount of the powder.

Silicone liquids of the type represented by the foregoing examples have the unique characteristic that their yield point or yield value and viscosity undergo minimum changes over the principal range of the operating temperature to which phonograph pickups and similar electromagnetic transducers operate, a factor of great practical value for the operation of such transducers.

In order to secure efficient transducer operation, the viscosity or the resistance to flow of the damping fluid should be kept at the lowest level, that is, sufficiently high to prevent or exclude creeping or bleeding of the liquid from the transducer casing by way of the opening through which the mechanical motion-transmitting connection passes to the exterior of the transducer casing for transmitting motion thereto from the exterior of the casing, or vice versa. To keep the viscosity of the damping liquid at the desired low level, the casing wall through which the motion-transmitting connection or member of the transducer passes into the exterior space, should be kept small, but nevertheless large enough to assure that the edge of the casing opening will not be engaged, contacted or hit by the motion-transmitting connection member when it vibrates with maximum amplitudes.

In the specific example of the transducer represented by the phonograph pickup of Figs. 1–6, its motion-transmitting member or connection is formed by the channel-shaped drive member 34 extending from the piezoelectric vibratory transducer 30 housed in the interior of casing 43, 44, into driving engagement with the exteriorly mounted stylus 21, so that undulations of the record groove 22 will be transmitted to the piezoelectric transducer 30 to generate therein a corresponding electric signal output. In the phonograph pickup shown (Figs. 1, 2, 6) the transducer drive extension or motion-transmitting member 34 is formed of sheet metal bent into an elongated, U-shaped channel formation so as to give the drive member 34 substantial stiffness in transmitting motion imparted to its coupling end 36 by the stylus 21 for generating in the transducer 30 a corresponding electric signal output. The stylus drive rod 23 which carries the stylus 21, together with recessed coupling end 36 of the stiff transducer drive extension 34 of the piezoelectric transducer 30, constitute the motion-transmitting member or connection which transmits the motion of the stylus 21 to the transducer 30, or vice versa, in case the transducer 30 is utilized to drive the stylus 21 for making a new record corresponding to electric signals impressed on transducer 30.

In the phonograph pickup shown in Figs. 1–6, the forward part of the casing compartment 45 through which the forward part of the transducer 30 and its drive extension 34 extend, is filled with a viscous damping fluid for damping the resonant peak vibrations of the transducer and/or various portions thereof, and securing a flat response thereof over the desired wide frequency range. To enable use of a damping fluid of low viscosity while keeping it confined in the relatively large compartment space 45 of the casing, and preventing it from flowing or creeping out therefrom, the bottom opening of the compartment is enclosed by elongated closure strip or wall 51 of flexible sheet material. In the form shown (Figs. 1, 2, 6), the closure strip 51 is formed of elastic sheet material deformed so that when its two ends are placed in retaining grooves 45–3, 45–4 of the casing 43, the elastic restoring forces of the closure strip 51 will cause it to be biased in interlocking engagement with the retaining groove 45–3, 45–4 of the casing, so as to be retained therein unless it is deliberately removed with an external force.

The central part of the closure strip 51 is provided with a slit or rectangular opening 51–1 through which the motion-transmitting connection, or specifically, the coupling portion 38 of its transducer drive extension 34, passes into driving engagement with the stylus drive rod 23. The slit or wall opening 51–1 of the closure wall 51 is sufficiently large so as to permit the part of the motion-transmitting member passing therethrough to vibrate freely therein without coming in contact with the edges of wall opening 51–1. As an example, without thereby limiting the scope of the invention, a commercial pickup of the type shown has a rectangular closure wall or strip 51 of flexible spring sheet metal about 0.010 inch thick, $\frac{7}{32}$ of an inch wide, and $\frac{3}{8}$ of an inch long. The rectangular wall opening 51–1 through which the transducer drive coupling portions 36 passes, is $\frac{1}{16}$ of an inch wide in the direction of the major dimension of the closure strip, and $\frac{2}{16}$ of an inch wide in the direction transverse thereto. The cross-sectional area of the coupling portion 36 of the transducer structure occupies only a fraction of the area of the rectangular slit opening 51–1 of the cover wall 51, and is free to vibrate in the slit opening 51–1 with maximum amplitudes throughout the frequency response range of the pickup without coming in contact with or hitting the edges of wall opening 51–1 through which it passes. The viscous fluid which fills the casing compartment space 45 in which the forward part of the transducer 30 and its drive extension 34 vibrate, is retained in the compartment space 45 by the closure wall 51, and the viscous fluid does not leak, bleed or creep through the closure wall opening 51–1 or along the gap opening between its longer side edges and the adjoining side walls of the casing 43, 44.

In accordance with the invention, the part of the vibratory stylus drive connection which is immersed in the viscous medium, is provided with one or more vanes which vibrate relatively to the drive connection with a resonance frequency corresponding to a frequency response peak that should be eliminated by the resulting anti-resonant peak of the vane, and/or with a resonance frequency near or beyond the highest frequency of its response, for thereby extending its response to higher frequencies. In accordance with the invention, a part of the motion-transmitting connection of the transducer 30, such as its drive extension 34, which is formed of stiff sheet metal, is provided along an edge region of its sheet metal with one or more integral sheet metal vanes 38 which vibrate relatively to the stiff drive extension 34 with the desired resonance frequency, for eliminating or suppressing a corresponding resonance peak of its response or for extending its frequency response to higher frequencies.

In the case of the transducer structure of Figs. 1 to 6, the transducer drive extension or motion-transmitting connection 34 is provided with a vane 38 extending from an edge portion of the channel-shaped sheet formation thereof. In the specific pickup of the invention as shown in Figs. 1 to 6, the transducer structure 30, when not subjected to a viscous damping medium, and having no vane 38 on its driving extension 34, operates with a vibratory mode having a resonant peak at about 6000 cycles per second (c.p.s.). In accordance with the invention, the transducer structure 30 is provided with a vane 38 extending from the sheet metal edge of its drive extension 34 so that the vane 38 vibrates relatively to drive extension 34 with a resonant frequency of about 6000 cycles or a frequency corresponding to the frequency of the resonant peak of the response of the transducer structure assembly, which does not have such vane 38. The provision of such vane 38 introduces into the frequency response of the transducer structure 30 an anti-resonant peak at about 6000 c.p.s., which compensates for the resonant peak of its response when operating without such vane 38. By immersing the vibratory structure or at least a region of the vibratory structure of the transducer provided with such vane or vanes 38, in a viscous liquid damping medium, a transducer of the foregoing type will operate with substantially a uniform response over the desired wide frequency range. The transducer structure of the type shown or its drive extension 34, may be provided with several vibratory vanes such as vane 38, each designed to vibrate with a different vibratory mode having a different resonant peak relatively to the drive extension 34 for compensating for the different resonant peaks of the transducer structure operating without such vanes, or for extending the response of the transducer structure above the highest frequency at which it would operate without such additional vanes, or to accomplish all of these objectives. Thus, in the case of a transducer structure of the type shown, having a response which droops rapidly above 10,000 c.p.s., the response of such transducer may be extended to 11,000 c.p.s. and beyond, by providing its drive extension with a vane similar to vane 38, which vibrates relatively to the drive extension with a mode having a resonant peak at 11,000 c.p.s. By immersing the vibratory part including the vane 38 of such transducer structure in a viscous medium in the manner described above, its resonant response peaks will be dampened and it will operate with a substantially flat response up to and beyond 11,000 c.p.s.

Without thereby limiting the scope of the invention, but only in order to enable more ready practice thereof, there are given below specific data of the design of the drive extension 34 of the transducer 30 of the specific pickup of Figs. 1–6. To keep the mass of the drive extension 34 low, it was formed of titanium sheet material .006 inch thick. The coupling tongue 36 of the drive extension was .110 inch long, and its part extending between the coupling tongue 36 and the ears 35 with which it is secured to the transducer 30, was .165 inch long. The vane 38 which extends from an upwardly facing edge of the channel-shaped drive extension 34, was of the same thickness, to-wit, .006 inch thick, and it was .166 inch long and .050 inch wide.

In the phonograph pickup of Figs. 1–6, the stylus drive rod 23 with its two styli 21 carried at the front end thereof, is provided at its rear end with a relatively rigid enlarged generally cylindrical mounting or pivot member 65 forming with it a detachable stylus drive structure. The cylindrical pivot member 65 serves as a mounting portion of the stylus drive rod 23, and is rotatably seated within a guide structure 70 held affixed to the bottom region of the rear part of the pickup mounting structure or casing 43, 44. The cylindrical pivot member 65 of the stylus drive structure has an intermediate seating section 67 of somewhat reduced diameter, which is adjoined by wider portions of the stylus pivot member 65 which form seating limits thereof. The intermediate part of the seating section 67 of the stylus pivot member 65 has an eccentrically offset or bent bias element 68 which serves, as explained hereinafter, to automatically bring the stylus drive rod structure to one or the other of the opposite end positions when it is rotated past an intermediate position from one groove-engaging stylus position to the other. The relatively wide mounting member 65 of the stylus drive rod 23 is formed of hollow tubing, and holds in its open end an elongated elastic elastomer body (not shown) in which the flattened rear end of the light tubular stylus drive rod 23 is positioned or embedded, this elastomer body forming the sole connection between the stylus drive rod 23 and its rigid metallic mounting member 65.

The casing or mounting structure 43, 44 of the pickup is provided with a guide structure 70 arranged to operatively hold therein the seating region of the mounting member 65 of the stylus drive rod or the stylus drive structure 23, so that it may be rotated around its axis from one operative groove-engaging stylus position to the opposite stylus position. The stylus rod pivot member 65 has a laterally extending grip 69 to facilitate turning of the stylus drive rod 23 to its opposite stylus positions.

In accordance with the present invention, all elements of the guide structure 70 for the stylus drive rod 23 are formed of a single, integral sheet member having mounting portions with which it is secured or affixed to the mounting or casing structure of the pickup, and also seating and biasing elements by means of which the seating portion 67 of the mounting member 65 of the stylus drive rod structure 21 is held in its operative position adjacent the transducer structure 30 of the pickup for rotation between its two different stylus positions, and also permitting detachable removal and replacement of the stylus drive structure 23 from and into its operative position in the pickup.

Figures 4, 5:
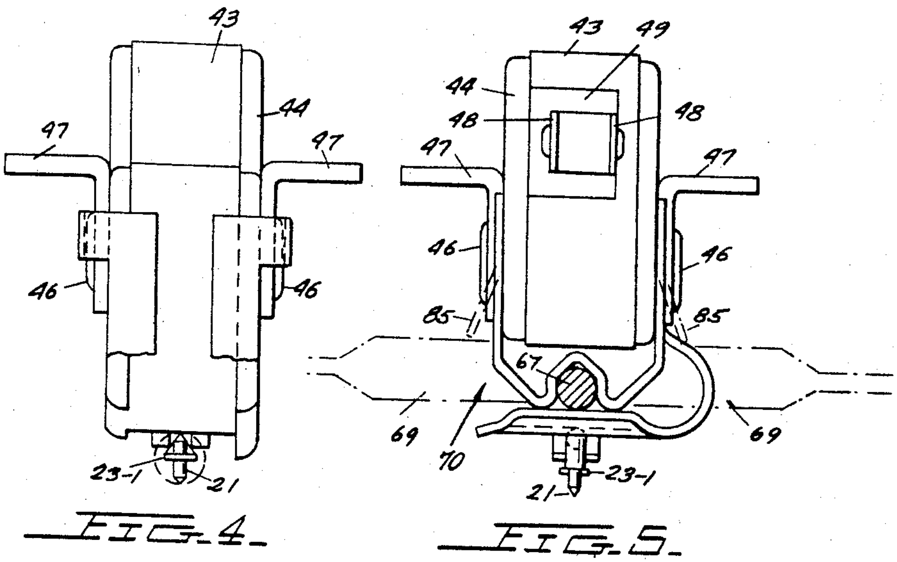
Fig. 4 is a front end view of the pickup as seen from the left in Fig. 1.
Fig. 5 is a rear end view of the pickup as seen from the right of Fig. 1.
Figure 6:
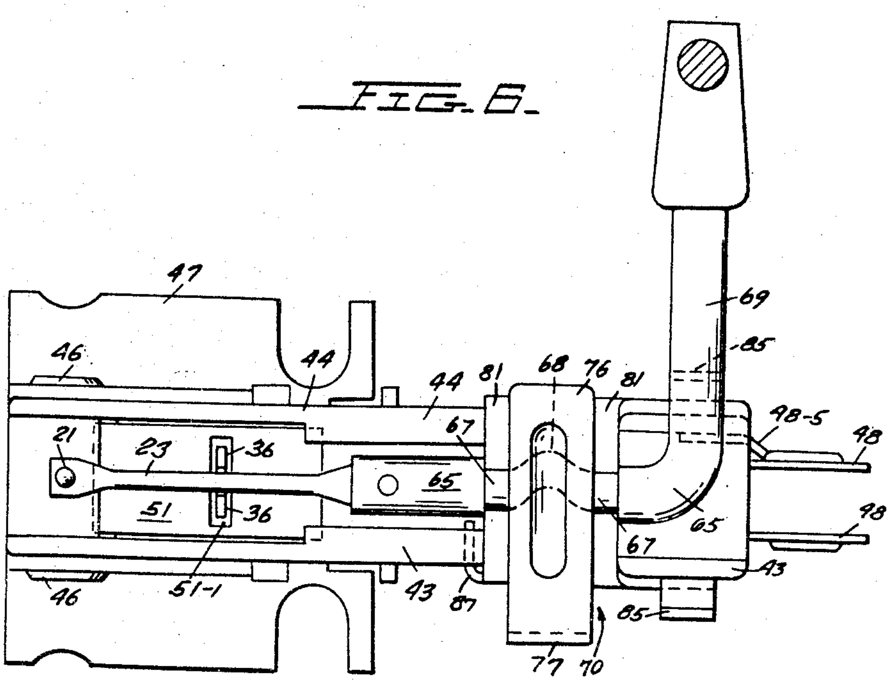
Fig. 6 is a bottom view of the pickup of Fig. 1.
Figure 7:
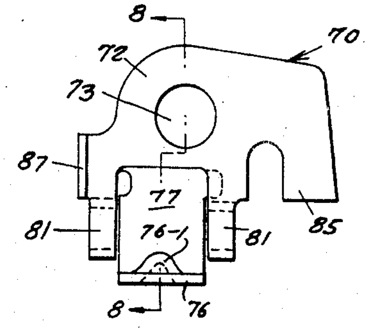
Fig. 7 is a side view of the guide structure for the stylus drive rod of the pickup of Figs. 1 to 6.
Figure 8:
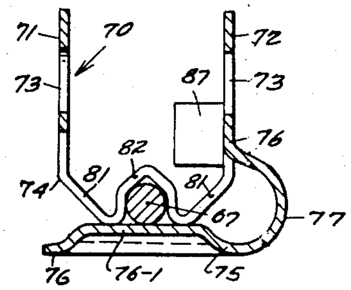
Fig. 8 is a cross-sectional view along lines 8—8 of Fig. 7.
Figure 9:
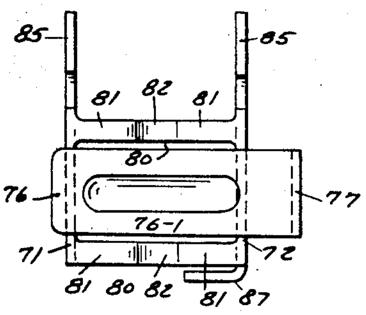
Fig. 9 is a bottom view of the guide structure of Figs. 7 and 8.
Figure 11:
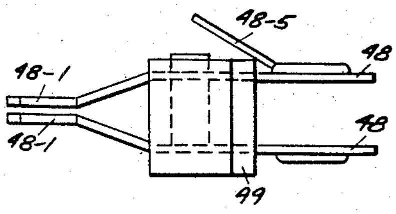
Fig. 11 is a bottom view of the terminal assembly of Fig. 10.
Figure 10:
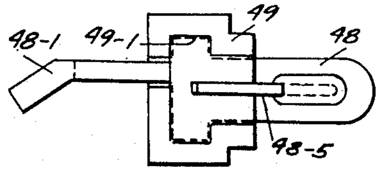
Fig. 10 is a side view of the terminal assembly of the pickup of Figs. 1 to 6.
Figure 12:
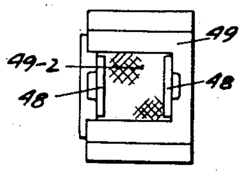
Fig. 12 is a rear end view of the terminal assembly of Figs. 10 and 11.

Figs. 1, 5 and 6 show the guide structure 70 of the stylus drive rod as it is mounted or affixed on the casing structure 43, 44 of the pickup, Figs. 7, 8 and 9 being side, cross sectional, and bottom views of the guide structure 70 itself, without the pickup. Referring to these figures, the guide structure 70 is formed of a sheet member of spring material, such as sheet metal, generally bent into a U-shaped structure having two side arms 71, 72 shaped to overlie and engage the exterior surfaces of the casing side walls 43, 44, and to be held secured thereto by the rivet 46 passing through holes 73 in the side arms. The guide structure sheet member 70 has an intermediate elongated seat region 74 extending transversely between its two side arms 71, 72. The seat region 74 has a cut-out retainer or bias tongue portion 75 extending from a transverse edge 76 of an opening 80 formed in sheet member 70. The sheet opening 80 is bordered by two side seating sections 81 of the intermediate seating region 74 of the sheet structure 70. Each of the two border or seating sections of sheet member 70 adjoining its opening 80, has a bent reentrant seat portion 82 which provides rotary bearing seats for the intermediate cylindrical seat region 67 of the mounting member 65 of the stylus drive rod for holding it rotatably in its operative position in the pickup. The end portion 76 of the retainer tongue 75 of the guide sheet 70 is stiffened by a longitudinal rib deformation 76–1, and forms a locking or bias end part thereof, and it is held in operative position by its arcuate springy rear junction portion 77 so as to be pressed by the restoring forces of its elastically deformed spring structure against the central region 68 of the seating region 67 of the stylus drive rod mounting structure 65 for holding and retaining it within the seating section 82 of the guide sheet structure 70. The outwardly curved arcuate junction portion 77 of the retaining tongue 75 of the guide structure has sufficient length so as to store therein enough elastic restoring energy when it is in the position shown in Fig. 8, so as to exert on the intermediate bias portion 68 of the stylus drive rod seating region 67 sufficient bias forces to assure that it is held in its operative position within the recessed seating portions 82 of the guide structure 70 in which the stylus drive rod 23 is positively retained in its operative position in the pickup, as seen in Figs. 1–6. Furthermore, the outwardly curved junction portion 77 of the retaining tongue 75 of the guide structure 70, is designed and proportioned to store therein sufficient elastic restoring energy so as to permit outward flexing of the locking end part 76 of the retainer tongue 75 for removing the seating section 67 of the stylus drive rod mounting member 65 from the seats 82 of the guide structure for replacing a given stylus drive structure with another similarly seated stylus drive structure similarly held and retained in operative position against the seats 82 of the guide structure 70.

As seen in Figs. 1, 5–9, the edge portions of the two guide structure side arms 71 which face toward the rear of the pickup (as seen to the right in Figs. 1 and 7) have downward stop extensions 85 which are engaged by the lateral grip arm 69 of the pivot member 65 of the stylus drive rod 23 whenever it is brought to either one of the two stylus positions. The eccentrically offset arcuate intermediate bias portion 68 of the seating region 67 of the pivot member 65 of the stylus rod 23, is so arranged that the biasing forces exerted thereon by the deformed stiffening ridge 76–1 of the locking end 76 of the retainer tongue 75 cause it to be turned to either one of the two stylus positions of the stylus drive rod 23 when the bias portion 68 is turned by the turn grip 69 past the intermediate neutral position when bringing the stylus drive rod from one stylus position to the opposite stylus position.

The guide member 70 is also provided with a retainer lip 87 extending from the mounting arm 72 thereof and turned inwardly therefrom (Figs. 8, 9) and shaped to fit into a slit formed in the exterior side of casing wall 43 of the pickup, thereby facilitating assembly of the guide structure 70 in its proper operative position on the casing 43 of the pickup.

Figure 13:
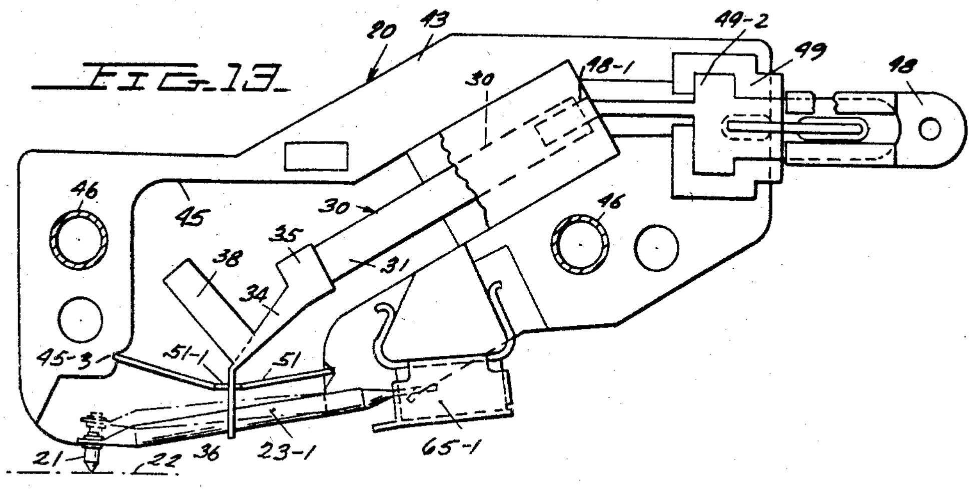
Fig. 13 is a view similar to Fig. 1 of a modified form of pickup operating with a single stylus.

Fig. 13 is similar to Fig. 1, showing a pickup similar thereto, and differing therefrom only by the use of a stylus drive rod 23–1 carrying a single stylus 21 only, the stylus drive rod being provided with a relatively rigid mounting structure 65–1 arranged for detachable mounting in its operative position on the casing of the pickup in the same manner as disclosed in the co-pending application of N. Dieter et al., Serial No. 487,508.

The features of the invention disclosed herein involving the unitary support for detachably holding a turnover stylus drive rod adjacent the transducer structure of a pickup, are claimed in the co-pending application Serial No. 605,307, filed August 21, 1956, of I. Michalko and F. A. Faillace.

The features and principles underlying the invention described above in connection with specific exemplifications, will suggest to those skilled in the art many other modifications thereof. It is accordingly desired that the appended claims shall not be limited to any specific features or details shown and described in connection with the exemplifications thereof.

I claim:

1. In an electro-mechanical transducer, a transducer structure having a vibratory portion which vibrates transversely to a major dimension thereof and a mounting structure forming a compartment with an opening through which a motion-transmitting part of said vibratory portion passes into the exterior space, and a silicone fluid in a space of said compartment adjoining said opening for controlling and damping the vibratory motion of said vibratory portion, said silicone fluid having dispersed therein inert powder particles in an amount between 2% to 7% of the total fluid, said opening being larger than the cross-sectional area of said vibratory portion passing therethrough for permitting transverse vibratory motion thereof within said opening, the silicone fluid in said compartment which has dispersed therein said inert powder particles having the property of being retained in its entirety within said compartment although said opening provides a passage through which the inert-particle-containing silicone fluid could escape to the exterior space.

2. In an electro-mechanical transducer, a transducer structure having a vibratory portion which vibrates transversely to a major dimension thereof and a mounting structure forming a compartment with an opening through which a motion-transmitting part of said vibratory portion passes into the exterior space, and a silicone fluid in a space of said compartment adjoining said opening for controlling and damping the vibratory motion of said vibratory portion, said silicone fluid having dispersed therein silica powder particles in an amount between 2% to 7% of the total fluid and a coating fluid in amounts of $\frac{1}{10}$ to $\frac{7}{10}$ the amount of said particles and having at most 3% solubility in said silicone fluid and tending to form a surface film at the interface between said silica particles, for maintaining said particles dispersed in said fluid, said opening being larger than the cross-sectional area of said vibratory portion passing therethrough for permitting transverse vibratory motion thereof within said opening, the silicone fluid in said compartment which has dispersed therein said silica powder particles having the property of being retained in its entirety within said compartment although said opening provides a passage through which the silica-particle-containing silicone fluid could escape to the exterior space.

3. A transducer as claimed in claim 1, said powder having a particle size in the range of the order of at most 30 millimicrons.

4. A transducer as claimed in claim 2, said silica powder having a particle size in the range of the order of at most 30 millimicrons.

5. A transducer as claimed in claim 4, said coating fluid being selected from a polyalkalene glycol and derivatives of polyalkalene glycol.

References Cited in the file of this patent

UNITED STATES PATENTS

| | | |
|---|---|---|
| 2,313,129 | Dohan | Mar. 9, 1943 |
| 2,594,948 | Lynch | Apr. 29, 1952 |